(12) United States Patent
Braeuer (10) Patent No.: US 10,808,849 B2
(45) Date of Patent: Oct. 20, 2020

(54) CONTROL VALVE FOR SETTING A PROCESS FLUID STREAM OF A PROCESSING PLANT

(71) Applicant: SAMSON AKTIENGESELLSCHAFT, Frankfurt (DE)

(72) Inventor: Anke Braeuer, Erlensee (DE)

(73) Assignee: SAMSON AKTIENGESELLSCHAFT, Frankfurt (DE)

( * ) Notice: Subject to any disclaimer, the term of this patent is extended or adjusted under 35 U.S.C. 154(b) by 171 days.

(21) Appl. No.: 15/214,684

(22) Filed: Jul. 20, 2016

(65) Prior Publication Data

US 2017/0023137 A1 Jan. 26, 2017

(30) Foreign Application Priority Data

Jul. 20, 2015 (DE) .................. 10 2015 009 421

(51) Int. Cl.
*F16K 5/18* (2006.01)
*F16J 15/3236* (2016.01)
(Continued)

(52) U.S. Cl.
CPC ............. *F16K 5/184* (2013.01); *F16J 15/028* (2013.01); *F16J 15/3212* (2013.01);
(Continued)

(58) Field of Classification Search
CPC . F16K 5/184; F16K 1/427; F16K 1/42; F16K 47/08; F16J 15/028; F16J 15/3236
(Continued)

(56) References Cited

U.S. PATENT DOCUMENTS 2,192,339 A * 3/1940 Wilson .................. F16K 1/34
251/334
2,722,232 A 11/1955 Roche, Jr.
(Continued)

FOREIGN PATENT DOCUMENTS

EP 0591873 A1 4/1994
EP 1800040 B1 6/2007
NL 7115333 A 5/1972

OTHER PUBLICATIONS

German document "Grundlehrgang Dichtungstechnik" and English language translation "Basic Training—Sealing technology" by Professor Dr.-Ing habil W. Haas, 2015.

*Primary Examiner* — John Bastianelli
(74) *Attorney, Agent, or Firm* — Schiff Hardin LLP (57) ABSTRACT

A control valve configured to set a process fluid stream of a processing plant can include a valve housing, a valve component, an annular-groove-shaped seal reception, and a seal. The valve housing can include an inlet, an outlet and an aperture extending between the inlet and the outlet along a longitudinal axis. The valve component can be mounted on the valve housing and can be a valve seat and/or a valve cage. The annular-groove-shaped seal reception can be confined by the valve component and the valve housing. The seal can be fit into the seal reception. The valve component and the valve housing can each form a respective ledge protruding in a radial direction to define the annular-groove-shaped seal reception. The ledges can each be configured to confine the seal reception in a respective axial direction.

21 Claims, 3 Drawing Sheets

(51) Int. Cl.
*F16J 15/02* (2006.01)
*F16K 1/42* (2006.01)
*F16K 47/08* (2006.01)
*F16J 15/3212* (2016.01)

(52) U.S. Cl.
CPC .............. *F16J 15/3236* (2013.01); *F16K 1/42* (2013.01); *F16K 1/427* (2013.01); *F16K 47/08* (2013.01)

(58) Field of Classification Search
USPC ........ 137/625.3; 251/324–325, 363; 277/647
See application file for complete search history.

(56) References Cited

U.S. PATENT DOCUMENTS

| | | | |
|---|---|---|---|
| 2,772,068 A | | 11/1956 | Grove et al. |
| 3,713,660 A | | 1/1973 | Luthe |
| 4,108,210 A | | 8/1978 | Luthe et al. |
| 4,155,536 A | | 5/1979 | Saiki |
| 4,658,847 A | | 4/1987 | McCrone |
| 6,840,520 B2 | * | 1/2005 | Faas .................. F16K 3/243 137/625.38 |
| 6,932,321 B2 | * | 8/2005 | Baumann ............... F16J 15/025 251/214 |
| 2002/0017327 A1 | * | 2/2002 | Kawaai ..................... F16J 9/08 137/625.3 |
| 2006/0048826 A1 | * | 3/2006 | Gossett .................. F16K 47/08 137/625.33 |
| 2008/0110506 A1 | * | 5/2008 | Igarashi .............. F16K 31/1268 137/488 |
| 2010/0301253 A1 | | 12/2010 | Perrault et al. |

\* cited by examiner

CONTROL VALVE FOR SETTING A PROCESS FLUID STREAM OF A PROCESSING PLANT

CROSS REFERENCE TO RELATED APPLICATIONS

This patent application claims priority to German Patent Application No. 102015009421.1, filed Jul. 20, 2015, which is incorporated herein by reference in its entirety.

BACKGROUND

The disclosure is directed to a control valve configured to set a process fluid stream of a processing plant, including a control valve of a processing plant such as a brewery, a petrochemical plant, a nuclear plant, a processing plant with explosion protection requirements, or the like.

Conventionally, a control valve can set a process fluid stream of the processing plant. Thereby, the control valve can be associated with a pneumatic position controller, which controls a pneumatic drive using a pneumatic secondary or auxiliary energy. In operation, the pneumatic drive brings the control valve into the desired control position.

The control valve has a valve housing comprising an inlet, an outlet and an aperture that extends between the inlet and the outlet, through which the process fluid shall stream. A valve member, such as a valve cone, is mounted translationally moveable within the valve housing in order to expand, to constrict or to close the aperture in accordance with the settings by the position controller. Within the valve housing, a valve component is separately mounted, wherein the valve component can be the actual valve seat against which the valve member abuts when closing the aperture, or wherein the valve component can be a valve cage which determines a defined stream flow rate through the aperture. Since leakage between the valve component and the valve housing is to be avoided, an annular seal reception can be provided between the valve housing and the valve component in which a seal is inserted. The seal reception is confined by the valve component and by the valve housing.

A conventional control valve is described in, for example, EP 1 800 040 B1, and includes a valve housing from one material having a first thermal expansion coefficient onto which valve housing a valve component from a material with a second, different thermal expansion coefficient is to be mounted. Especially in the case of different expansion behaviors at temperature gradients, a sufficiently good seal is required which can even out a relative movement between the structural components to be sealed. In order to compensate for the relative movement of the valve housing and the valve component, the seat reception is additionally provided with a holding means which holds the sealing ring within the seal reception in an axially determined position. The holding means can be realized by, for example, an additional holding ring, such as a snap-ring, or by means of a notch recess in the valve housing or in the valve component. Additional screw-on holding ring elements are provided which provide an axial abutment for the seal. Each of the examples described in EP 1 800 040 B1 have in common is that they realize, either through the valve housing or through the valve component, a seal reception confinement or a seal-holder, which is active in both axial directions. However, the design requirements are increased for this construction, in particular for realizing the holding function for the seal.

BRIEF DESCRIPTION OF THE DRAWINGS/FIGURES

The accompanying drawings, which are incorporated herein and form a part of the specification, illustrate the embodiments of the present disclosure and, together with the description, further serve to explain the principles of the embodiments and to enable a person skilled in the pertinent art to make and use the embodiments.

The exemplary embodiments of the present disclosure will be described with reference to the accompanying drawings.

DETAILED DESCRIPTION

In the following description, numerous specific details are set forth in order to provide a thorough understanding of the embodiments of the present disclosure. However, it will be apparent to those skilled in the art that the embodiments, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring embodiments of the disclosure.

It as an object of the present disclosure to provide a process fluid stream of a control valve for setting a processing plant, in which the constructive realization of the seal reception is simplified, in particular in that a separate holding means for the seal is not required.

In an exemplary embodiment, a control valve for setting a process fluid stream of a processing plant is driven by a pneumatic position controller, which for example emits a pneumatic control signal to a pneumatic drive after a desired-value/actual-value analysis. The pneumatic drive can actuate the control valve. The process fluid oftentimes poses a significant risk for the environment and for humans. Therefore, in exemplary embodiments, a control valve is configured such that aggressive media do not escape even under different operative load scenarios, such as large temperature spans. The control valve is part of a process fluid conduit of the processing plant and comprises a valve housing including an inlet for the intake of the process fluid stream into the valve housing, and an outlet. In an exemplary embodiment, between the inlet and the outlet, an aperture extends along a longitudinal axis of the valve housing. The aperture can have an aperture cross section to be expanded and constricted in accordance with the position of a valve member. The valve member can cooperate with the valve-housing-rigid valve component which can for example be formed as a valve seat or through a valve cage. The valve cage can comprise the valve seat.

In an exemplary embodiment, the valve component is a component being manufactured separately with regard to the valve housing, and can be mounted on the valve housing. In an exemplary embodiment, to avoid or reduce any escape stream of the process fluid between the valve component and the valve housing, an annular-groove-shaped seal reception is provided. In an exemplary embodiment, the annular-groove-shaped seal reception is structurally confined by the valve component and by the valve housing. In an exemplary embodiment, in the seal reception, a seal is inserted to avoid reduce leakage. In an exemplary embodiment, both the valve component as well as the valve housing section or valve housing each form a respective radially protruding ledge to realize the annular-groove-shaped seal reception. In an exemplary embodiment, both respective ledges each confine the seal reception in an axial direction. In an exemplary embodiment, the seal reception is confined through four side walls. In an exemplary embodiment, the four side walls are to one half formed by the valve component and to one half by the valve housing (2:2). In an exemplary embodiment, neither one of the components—valve component and valve housing—is dominantly responsible for forming the seal reception. In an exemplary embodiment, both the valve component and the valve housing each form a respective revolving sealing line and confine the sealing space in the axial direction. In an exemplary embodiment, both the valve component and the valve housing each also form the respective revolving sealing line and confine the sealing space in the radial direction, where the corresponding sealing lines are realized. Asides from a simplified assembly procedure, the effort for manufacturing is significantly reduced as an additional holding means for the seal, however it may be realized, is unnecessary. Further, the sealing function is maintained even in high temperature fluctuations because the seal within the seal reception is provided with clearance for yielding movement which can in particular be used by the seal when large movements occurring due to temperature gradients between the valve housing and the valve component. In an exemplary embodiment, the seal can be a single sealing ring, for example of a polymer material, such as an elastomer material or a thermoplastic material, or of an elastically-rigid material, such as a metal, or be made from a structural combination of a polymer material, such as an elastomer material, and a biasing-element which creates pre-tensioning forces towards the sealing faces, which act in the contact area where the sealing polymer material is arranged.

In an exemplary embodiment, the seal reception is confined in the radial direction by one respective revolving (e.g., cylindrical) confinement wall of the valve component and the valve housing each. For example, the confinement walls can be cylindrically, in particular, step-free between the ledge and the ledge-free-axial end, i.e.: without any recess particularly for fixing the seal. In an exemplary embodiment, the confinement walls are arranged concentrically to one another and/or concentrically in relation to the longitudinal axis, where a radial distance between the concentric confinement walls determines the radial width of the annular-groove-shaped seal reception space. In an exemplary embodiment, the cross section of the seal reception is constant in the circumferential direction, can be determined by flanks standing rectangular to one another and/or defining the ledges and the confinement walls. Thereby, one of the pair of flanks standing rectangular with respect to one another forms the confinement of the seal reception by the valve component, the other pair of flanks is formed by the valve housing.

In an exemplary embodiment, the seal reception is confined in the axial direction exclusively by radial side faces of the ledges of the valve component and of the valve housing facing one another. In particular, the seal reception is confined in the radial direction exclusively through axially extending confinement walls.

In an exemplary embodiment, in assembling the valve component on the valve housing, the valve component is telescopically moveable in the axial direction into one another with regard to the valve housing. The telescopic insertion movement of the valve component and the valve housing with respect to one another is also made possible insofar as the respective free axial end opposite to the respective ledge is formed without any corresponding radially directed ledge. The telescopic moveability of the valve component relative to the valve housing can for example be limited by a structural abutment such that a predetermined axial width of the seal reception is formed.

In an exemplary embodiment, the respective ledge of the valve component and of the valve housing each is formed from one piece of material together with the respective further adjacent component of said valve component/said valve housing. The component can for example also form the respective confinement wall.

In an exemplary embodiment, the coefficient of the heat expansion of the ("first") material of the valve housing and of the ("second") material for the valve component are different from one another. It shall be clear that alternatively the same material types can be considered for the valve housing as well as for the valve component. In an alternative embodiment, the ledges can also be realized as separate disc members or differently shaped building components which are attached separately to the valve component and/or to the valve housing by, for example, one or more screws. The ledge and the valve component or the valve housing, respectively, builds one structural, force conducting unit.

In an exemplary embodiment, the seal reception is sized in the axial direction such that, and the seal is adapted with regard to the dimensioning of the seal reception such that after completion of the assembly of the seal in the seal reception, the seal, in particular an elastic, shapeable sealing body of the seal, is arranged with an axial clearance towards both ledges (e.g., in an even distance to both ledges). In an exemplary embodiment, between the seal and the each axial ledge, there is a circumferential air gap. As would be understood, that the axial clearance is in certain operating conditions of the control valve removed due to a movement or expansion of the seal, and a contact between the seal and the respective ledge go along. However, during a normal operating condition or immediately after mounting, the seal is to be arranged such that it is contract-free with respect to one or both ledges so that freedom of movement is available in one or both axial directions for the seal.

In an exemplary embodiment, additionally or alternatively, the seal reception of the seal can be sized such that the seal, in particular an elastically deformable sealing body, can expand and/or move in the seal reception both opposite axial directions (from the mounting position) within the sealing-groove, in order particularly to engage into an axial contact with the ledge of the valve housing and/or of the valve component, which limit the seal reception in the axial longitudinal direction. It shall furthermore be clear that under extreme operating conditions of the control valve, in particular due to large expansion effects, an axial contact of the ledges and the seal may very well occur. In any event, immediately after completion of the assembly, the seal shall be enabled to expand in the axial direction, for example in order to even out a relative movement between the valve housing and the valve component induced by heat.

In an exemplary embodiment, the seal reception formed by the valve component and the valve housing is realized free of any holding members, unless the confinement walls and the ledges are discussed. For example, any holding means of the seal reception formed by the valve component and the vale housing consists exclusively of one of the confinement walls and/or one of the ledges.

In an exemplary embodiment, after completion of the assembly of the seal, the seal is in a fully circumferential sealing engagement with (both of) the axially extending confinement walls of the sealing walls. Even in case of the movement and/or expansion of the seal in the axial direction, which could be caused through the different coefficients of thermal expansion of the valve housing and of the valve component, the sealing engagement between the confinement walls and the seal is maintained.

In an exemplary embodiment, the sum of the distances of the axial clearances in both directions between the seal and the ledges is larger than an axial thermal-expansion of the valve component and of the valve housing at a predetermined (e.g., maximal) operating temperature difference. The coefficient of the thermal expansion of the valve component and of the valve housing can be different and/or known. In an exemplary embodiment, the axial clearance between the seal and the respective ledge immediately after assembly is larger than 0.5 mm or 1 mm and/or smaller than 5 mm or 3 mm.

In an exemplary embodiment, the axial clearance is configured to even out movements of the valve component or the valve housing occurring due to the temperature changes such that any engagement of the seal with the ledges is avoided within the temperature span occurring during operation.

In an exemplary embodiment, in a state of the valve component being assembled to the valve housing, the radially extending, annular seal reception, and the radially confining walls of the valve component, and of the valve housing, are cylindrically and arranged concentrically to one another, wherein, in particular, the cylindrical wall surfaces are free of any recesses so that the seal can be moved along the respective confinement wall.

In an exemplary embodiment, an inner or interior confinement wall of the seal reception, which is particularly associated with the valve component, on one side ends at the radially outwards projecting ledge, and on the other side ends at an axial end of the component forming the inner confinement wall, such as the valve component or the valve housing, with a radially inward projecting step. In this way it is provided that the seal can be shifted lengthwise along the interior confinement wall towards the seal reception or towards the sealing position.

In an exemplary embodiment, alternatively or additionally, an outer or exterior confinement wall of the seal reception, which is in particular associated with the valve housing, can on one side end at the radially inward projecting ledge ends and on the outer side end at an axial end of the component forming the outer confinement wall, such as the valve housing or the valve component, with a radially outward projecting step, so that the seal can in particular essentially without radial widening be inserted at the radial end to the seal reception.

In an exemplary embodiment, one valve component and one valve housing, each, is realized with an assembly section followed by and/or adjacent to the seal reception, the assembly section for example being realized by screw threads. The assembly section serves for firmly attaching the valve component to the valve housing with an assembly section.

In an exemplary embodiment, the seal has a sealing body in the shape of a sealing ring, which completely revolves in the circumferential direction. In an exemplary embodiment, the sealing ring can be made of a polymer material, such as an elastomer material or a thermoplastic material, such as PTFE, and/or of a metal, such as steel, aluminum, etc. The sealing ring can comprise an essentially O-shaped, C-shaped, V-shaped, or U-shaped cross section.

In an exemplary embodiment, the seal can comprise a spreading spring made of a rigid material, such as a polymer material, a metal or the like. The spreading spring can elastically pretension the sealing body, in particular of an elastomer material, against the confinement walls of the seal reception for creating the desired circumferential sealing line or sealing area. Thereby, the spreading spring can for example comprise an essentially O-shaped, C-shaped, V-shaped, or U-shaped cross section.

Figure 1:
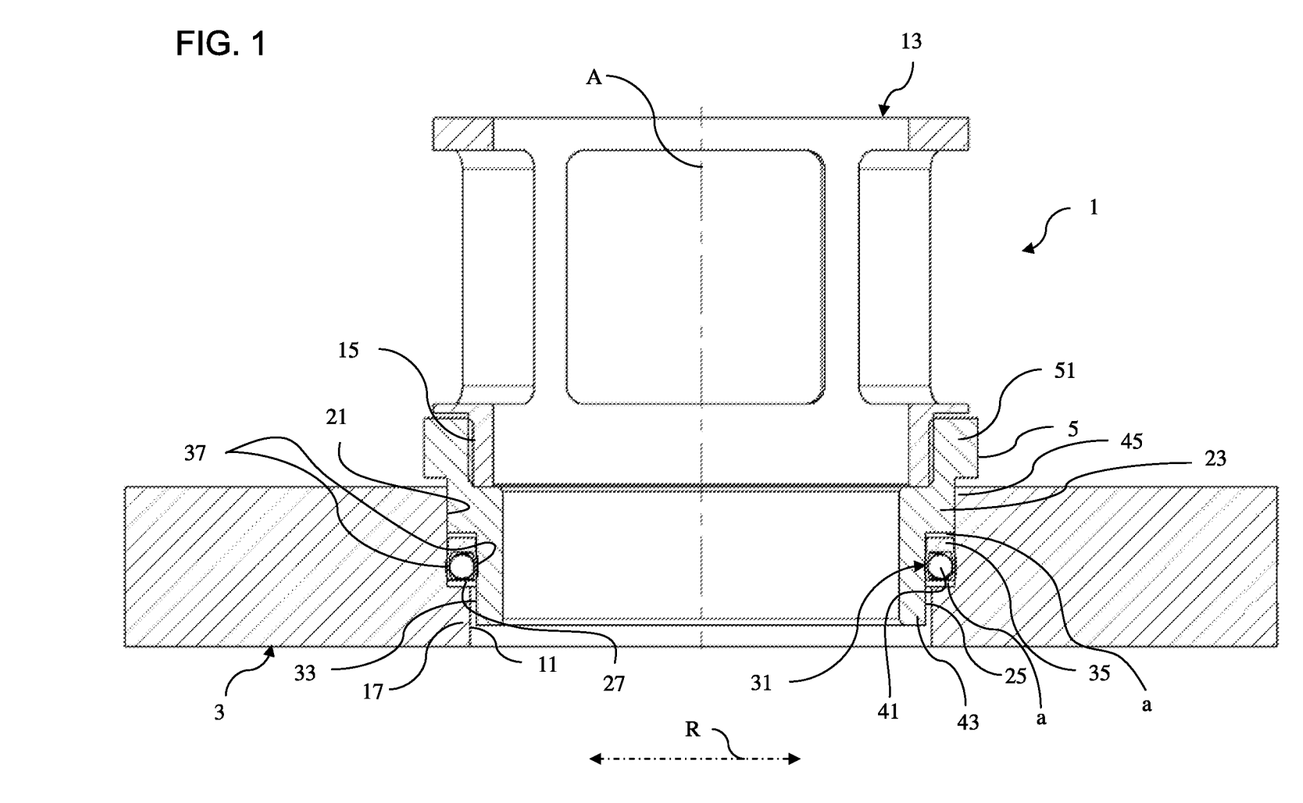
FIG. 1 illustrates a cross sectional view of a control valve according to an exemplary embodiment of the present disclosure.

FIG. 1 illustrates a control valve 1 according to an exemplary embodiment of the present disclosure. For a simplified illustration, the valve housing and the valve member of the control valve are shown in reduced detail. However, these components shall be considered to be included in the further description.

In FIG. 1, the control valve is generally indicated with reference numeral 1. The control valve 1 includes a valve housing section 3 and a valve cage 13 to which the valve seat 5 is attached via a screw connection 15. The valve seat 5 is inserted into the valve housing section 3 via a corresponding opening 11.

Within the valve cage 13, the valve member, which is not shown in further detail, is moveably mounted in order to dilate or to constrict, in particular to close completely, the aperture (not shown in detail) of the control valve.

The valve housing section 3 is, with regard to the valve seat 5, arranged radially outward surrounding with respect to the valve seat 5 and comprises a radially inward facing ledge 17, which in regard to the thickness of the valve housing, is arranged towards the outside of the control valve 1. Following the ledge 17, a confinement wall 21 is joined which is configured cylindrically. Also the inwardly facing surface of the ledge 17 is realized, for example, cylindrically.

In an exemplary embodiment, the valve seat 5 is telescopically pushed into the aperture 11 of the valve housing section 3 relative to the confinement wall 21 and forms a radially outward facing ledge 23, which protrudes radially outwardly from an interior confinement wall 25 which extends in the axial direction A.

Figure 3:
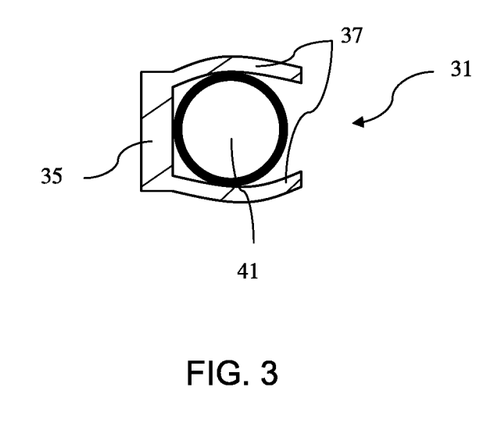
FIG. 3 illustrates a cross sectional view of a seal according to an exemplary embodiment of the present disclosure that is adapted to be arranged between a valve housing and a valve component.

The ledge 23 of the valve seat 5 as well as the ledge 17 of the valve housing section 3 confine a seal reception 27 in the axial direction A which is rectangular shaped in cross section. In the seal reception 27, a seal 31 is arranged so that process fluid cannot escape along the gap 33 and along the confinement walls 21, 25. In an exemplary embodiment, the seal 31, which is shown in further detail in FIG. 3, includes a sealing body 35 which is fork-shaped in its cross section having two revolving prongs 37, which are pushed against the confinement walls 25, 21 via a radial spreading spring 41. In an exemplary embodiment, the sealing body 35 is made of a polymer material, such as a elastomer material or a thermoplastic material, such as PTFE, while the spreading means can be made of a metal ring. Therefore, a metal ring could be provided which in its cross section has an O-shape, C-shape, U-shape or V-shape.

With reference to FIG. 1, In an exemplary embodiment, the seal reception 27 is structurally confined in the axial direction A both by the valve seat 5 as well as by the valve housing section 3 (due to the ledges 17, 23). In the radial direction R, the seal reception 27 is confined by the cylindrical exterior confinement wall 21 and by the cylindrical interior confinement wall 25.

In an exemplary embodiment, the seal 31 is arranged centrally within the sealing reception 27 such that an axial distance 'a' towards the side flanks of the ledges 23 or 17, respectively, is formed. In an exemplary embodiment, the axial clearances 'a' are of equal size and allow for a moveability of the seal 31 relative to the valve seat and/or to the valve housing section 3. In an exemplary embodiment, the sum of both axial distances and clearances are larger than the heat-expansion-difference (for different thermal expansion coefficients) of the valve seat 5 and the valve housing section 3. The axial clearance 'a' can, for example, be at least 0.5 mm or 1 mm, depending on the formation of the diameter of the control valve 1. In an exemplary embodiment, the axial clearance 'a' can be configured not to exceed 5 mm or 3 mm, depending on the diameter of the control valve 1.

Since the valve seat 5 and the valve housing section 3 can include different thermal expansion coefficients, an axial relative movement between the two components can be realized, which, due to the contact-free arrangement of the seal 31 within the seal reception, can easily be compensated, wherein a simple assembly of the seal 31 over the free axial ends 43 of the valve seat or over the free axial ends 45 of the valve housing section 3 can be realized. Spreading the seal 31 for passing the axial end is not required.

In an exemplary embodiment, the seal 31 can be undersized or oversized with respect to one of the two confinement walls 25, 21, in order to provide a radial pretension of the elastic spreading element 41 of the revolving sealing faces onto one of the confinement walls 21, 25.

On the section 51 of the valve seat 5 protruding towards the control valve housing interior, the valve cage 13 is attached via a screw connection, as shown above, wherein the section 51 of the valve seat 5 comprises an inner threading and the cage on the respective section comprises screw threads.

Figure 2:
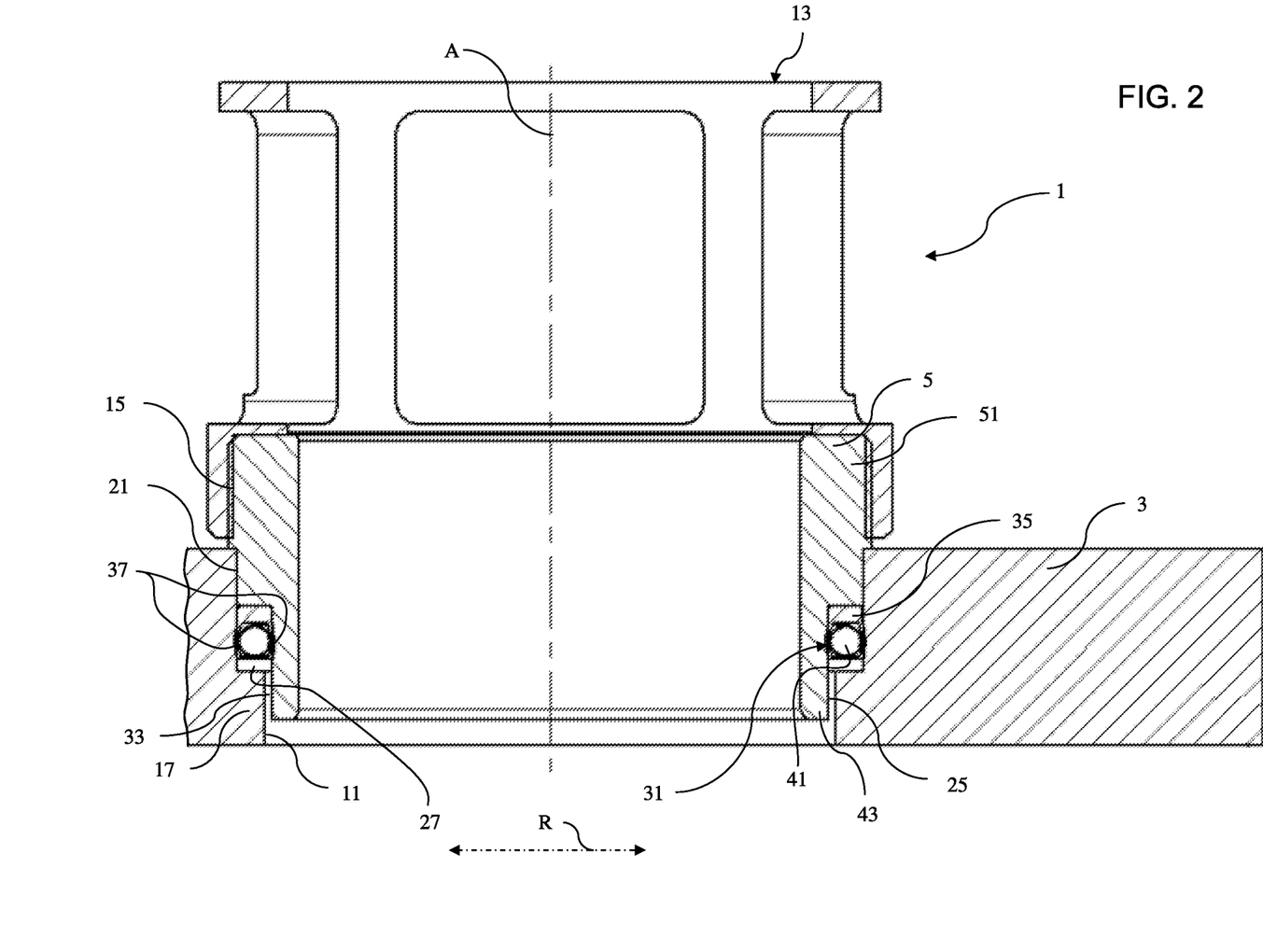
FIG. 2 illustrates a cross sectional view of a control valve according to an exemplary embodiment of the present disclosure.

An exemplary embodiment of the control valve 1 is illustrated in FIG. 2. The exemplary embodiment illustrated in FIG. 2. Is similar to the embodiment illustrated in FIG. 1, but the control valve 1 of FIG. 2 differs from that of FIG. 1 in that the screw connection of the valve cage 13 to the valve seat 5. For example, the section 51 of the valve seat 5 includes an exterior threading or screw threads and the valve cage 13 at a corresponding section has an inner threading. The same or identical components are referenced using the same reference numerals as in FIG. 1.

The features disclosed in the above description, the figures and the claims can be of relevance for realizing the disclosure in the various exemplary embodiments individually, as well as in any combination thereof.

CONCLUSION

The aforementioned description of the specific embodiments will so fully reveal the general nature of the disclosure that others can, by applying knowledge within the skill of the art, readily modify and/or adapt for various applications such specific embodiments, without undue experimentation, and without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The exemplary embodiments described herein are provided for illustrative purposes, and are not limiting. Other exemplary embodiments are possible, and modifications may be made to the exemplary embodiments. Therefore, the specification is not meant to limit the disclosure. Rather, the scope of the disclosure is defined only in accordance with the following claims and their equivalents.

REFERENCE LIST 1 control valve
3 valve housing section
5 valve seat
11 aperture
13 valve cage
15 screw connection
17, 23 ledge
21 outer confinement wall
25 inner confinement wall
27 seal reception
31 seal
35 sealing body
37 prong
41 spreading spring
43, 45 free end
51 section
a axial clearance
A axial direction
R radial direction

What is claimed is:

1. A control valve configured to set a process fluid stream of a processing plant, comprising:
    a valve housing including an inlet, an outlet and an aperture extending between the inlet and the outlet along a longitudinal axis;
    a valve component configured to be mounted on the valve housing, the valve component being a valve cage with a valve seat;
    an annular-groove-shaped seal reception that is confined by the valve seat and the valve housing; and
    a seal configured to fit into the seal reception, wherein:
    the valve seat and the valve housing each form a respective ledge protruding in a radial direction to define the annular-groove-shaped seal reception, the respective ledges of the valve seat and the valve housing each being configured to confine the seal reception in a respective axial direction;

in a normal operating condition or immediately after assembly, the seal is arranged in the seal reception such that the seal is contact free with respect to at least one of the ledges, the seal reception being confined in the radial direction by revolving confinement walls of the valve seat and of the valve housing; and to mount the valve seat on the valve housing, the valve seat is configured to be telescopically moveable relative to the valve housing, in the axial direction, and into one another such that a predetermined axial width of the seal reception is formed.

2. The control valve according to claim 1, wherein:
the revolving confinement walls being arranged concentrically with respect to the longitudinal axis, and a cross section of the seal reception is determined by flanks that are arranged rectangularly relative to one another and which are defined by the ledges and the confinement walls.

3. The control valve according to claim 2, wherein the revolving confinement walls are cylindrical.

4. The control valve according to claim 1, wherein:
the seal reception is confined in the axial direction exclusively by radial side faces of the ledges of the valve seat and the valve housing, the radial side faces facing one another, and
the seal reception is confined in the radial direction exclusively by the confinement walls extending in the axial direction.

5. The control valve according to claim 1, wherein:
the respective ledges of the valve seat and of the valve housing each are made from a single piece of material, the ledges of the valve seat and of the valve housing being arranged adjacent to each other to form the respective confinement walls, and
a coefficient of thermal expansion for the material of the valve housing and a coefficient of thermal expansion for the material for the valve seat differ from one another.

6. The control valve according to claim 1, wherein:
the seal reception is dimensioned in the axial direction and is configured regarding the dimensioning of the seal reception such that after completion of assembly of the seal in the seal reception, the seal being arranged with an axial clearance to both ledges.

7. The control valve according claim 6, wherein a sum of both axial clearances is determined by a difference of thermal expansion at different coefficients of thermal expansion of the valve seat and of the valve housing.

8. The control valve according to claim 1, wherein:
the seal reception is dimensioned in the axial direction and is configured regarding the dimensioning of the seal reception such that after completion of assembly of the seal in the seal reception, the seal being configured to move in both opposite axial directions within the seal reception while maintaining a completely revolving sealing contact and without coming into an axial contact with the ledge of the valve housing and the ledge of the valve seat,
the ledges extend in the radial direction and confine the seal reception in the axial direction,
after completion of a mounting of the seal, the seal is configured to stand in the completely revolving sealing contact with both confinement walls.

9. The control valve according to claim 1, wherein:
when the valve seat is mounted to the valve housing, the annular groove-shaped seal reception that extends in the radial direction and the confinement walls of the valve seat and of the valve housing that extend in the radial direction are arranged cylindrically and concentrically with respect to each other, and
cylindrical faces of the confinement walls of the valve seat and of the valve housing are free of recesses such that the seal is moveable along the respective confinement walls.

10. The control valve according to claim 1, wherein:
an inner confinement wall of the seal reception ends at the radially outwardly protruding ledge on one side and ends at an axial end of the valve seat or the valve housing to define the inner confinement wall with a radially inwardly protruding step to configure the seal reception to accept the seal into the seal reception; and/or
an outer confinement wall of the seal reception ends at the radially inwardly protruding ledge on one side and ends at an axial end of the valve seat on another end to define the outer confinement wall with a radially outwardly protruding step to configure the seal reception to limit radial movement of the seal.

11. The control valve according to claim 1, wherein a mounting section is formed following and/or adjacent to the seal reception on the valve seat and on the valve housing, respectively, to mount the valve seat to the valve housing.

12. The control valve according to claim 1, wherein the seal comprises:
a sealing body in a form of a sealing ring made of an polymer material and/or of a metal, the sealing ring having an O-shaped, C-shaped, V-shaped or U-shaped cross section; and
a spreading spring made of a rigid material that is configured to elastically pretension the sealing body against confinement walls of the seal reception to form a revolving sealing line, the spreading spring having an O-shaped, C-shaped, V-shaped or U-shaped cross section.

13. The control valve according to claim 1, wherein the seal is an elastically deformable sealing body.

14. The control valve according to claim 1, wherein the seal is contact free with respect to both of the ledges.

15. The control valve according to claim 1, wherein the seal comprises:
a sealing body having revolving prongs; and
a biasing member configured to bias the revolving prongs of the sealing body against confinement walls of the seal reception to form a revolving sealing line.

16. The control valve according to claim 15, wherein the biasing member is positioned between respective ones of the revolving prongs to bias the revolving prongs away from one another and towards the confinement walls of the seal reception.

17. The control valve according to claim 1, wherein the valve cage is configured to translationally movably house a valve member mountable within the valve cage to dilate or to constrict the aperture.

18. The control valve according to claim 1, wherein the valve cage and the valve seat are separate components, the valve seat being attachable to the valve cage.

19. The control valve according to claim 1, wherein the valve cage is configured to determine a defined stream flow rate of the process fluid stream through the aperture.

20. The control valve according to claim 1, wherein the valve cage is threadably connected to the valve seat.

21. A control valve configured to set a process fluid stream of a processing plant, comprising:

a valve housing including an inlet, an outlet and an aperture extending between the inlet and the outlet along a longitudinal axis;

a valve component configured to be mounted on the valve housing, the valve component being a valve cage with a valve seat, wherein the valve cage is threadably connected to the valve seat;

an annular-groove-shaped seal reception that is confined by the valve seat and the valve housing; and a seal configured to fit into the seal reception, wherein the valve seat and the valve housing each form a respective ledge protruding in a radial direction to define the annular-groove-shaped seal reception, the respective ledges of the valve seat and the valve housing each being configured to confine the seal reception in a respective axial direction, and wherein, in a normal operating condition or immediately after assembly, the seal is arranged in the seal reception such that the seal is contact free with respect to at least one of the ledges, the seal reception being confined in the radial direction by revolving confinement walls of the valve seat and of the valve housing.

\* \* \* \* \*